(12) United States Patent
Lamba et al.

(10) Patent No.: US 11,818,297 B2
(45) Date of Patent: *Nov. 14, 2023

(54) MULTI-CHANNEL HYBRID MODELS FOR EFFICIENT ROUTING

(71) Applicant: INTUIT INC., Mountain View, CA (US)

(72) Inventors: Prarit Lamba, San Diego, CA (US); Clifford Green, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,425

(22) Filed: Mar. 3, 2023

(65) Prior Publication Data

US 2023/0208975 A1 Jun. 29, 2023

Related U.S. Application Data

(63) Continuation of application No. 17/656,848, filed on Mar. 28, 2022, now Pat. No. 11,622,042, which is a continuation of application No. 17/389,214, filed on Jul. 29, 2021, now Pat. No. 11,323,570.

(51) Int. Cl.
| | |
|---|---|
| *H04M 3/523* | (2006.01) |
| *G06F 40/20* | (2020.01) |
| *G06K 9/00* | (2022.01) |
| *H04M 3/51* | (2006.01) |
| *G06V 30/40* | (2022.01) |
| *G06F 18/214* | (2023.01) |
| *G06F 18/21* | (2023.01) |

(52) U.S. Cl.
CPC ........ *H04M 3/5233* (2013.01); *G06F 18/214* (2023.01); *G06F 18/2178* (2023.01); *G06F 40/20* (2020.01); *G06V 30/40* (2022.01); *H04M 3/5191* (2013.01); *H04M 3/5235* (2013.01); *H04M 3/5238* (2013.01)

(58) Field of Classification Search
CPC ............. H04M 3/5233; H04M 3/5191; H04M 3/5238; G06K 9/00442; G06F 40/20
USPC ............ 379/265.09, 265.05, 265.01, 265.07, 379/265.11, 265.13, 265.12, 265.14, 379/266.01, 265.06
See application file for complete search history.

(56) References Cited

U.S. PATENT DOCUMENTS

| | | | |
|---|---|---|---|
| 9,742,916 | B1 | 8/2017 | Christopher |
| 2007/0003042 | A1 | 1/2007 | Paden |
| 2019/0325029 | A1 | 10/2019 | Gandhi |
| 2021/0158234 | A1 | 5/2021 | Sivasubramanian |
| 2021/0158805 | A1 | 5/2021 | Sivasubramanian |
| 2021/0224306 | A1* | 7/2021 | Choudhary ............. G06F 18/23 |

* cited by examiner

*Primary Examiner* — Thjuan K Addy
(74) *Attorney, Agent, or Firm* — DLA PIPER LLP (US)

(57) ABSTRACT

Systems and methods are used to generate contact type predictions that route user customer service requests within a support platform. The contact type predictions are generated using a hybrid model that includes a deep learning component and a business logic component. The deep learning component may generate a multi-channel output based on text features and context features. The multi-channel output is modified based on one or more business rules to generate the contact type predictions.

20 Claims, 5 Drawing Sheets

MULTI-CHANNEL HYBRID MODELS FOR EFFICIENT ROUTING

CROSS REFERENCE TO RELATED APPLICATIONS

This application is a continuation of U.S. application Ser. No. 17/656,848, filed Mar. 28, 2022, which is a continuation of U.S. application Ser. No. 17/389,214 filed Jul. 29, 2021, now U.S. Pat. No. 11,323,570, issued May 3, 2022. The entirety of the above-listed applications is incorporated herein by reference.

BACKGROUND

Software platforms may offer a wide variety of products and services to many different types of users. Despite careful design, some aspects of the products and services offered on a software platform may not be intuitive to some users. To provide a better experience for users and maximize the likelihood they will continue to use a particular software platform, it is desirable to efficiently address a wide variety of questions and other requests from users. Thus, it would be advantageous to route user requests to a customer service agent optimized to handle each request.

DETAILED DESCRIPTION OF SEVERAL EMBODIMENTS

Figure 1:
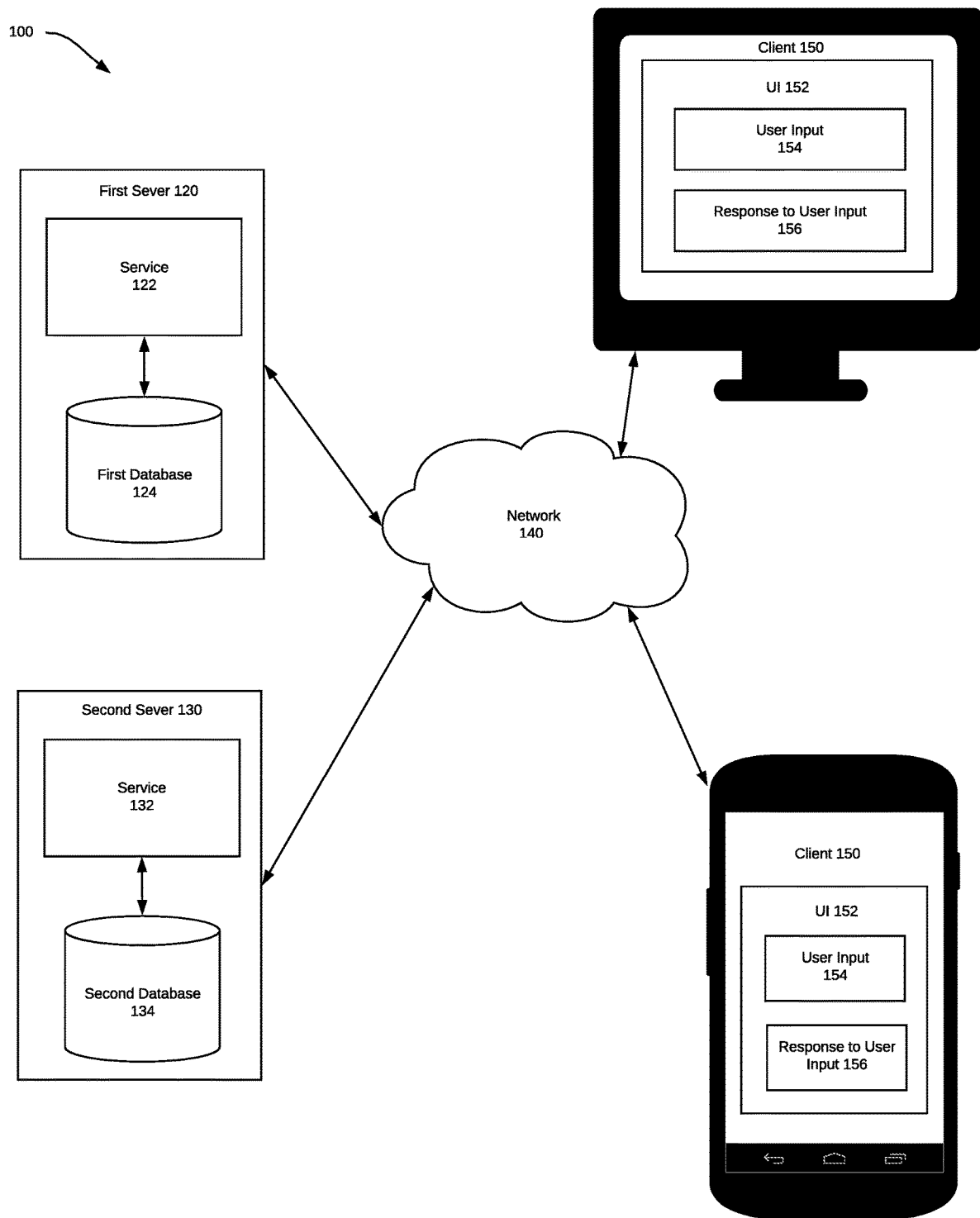
FIG. 1 shows an exemplary system configured to generate and use routing predictions in accordance with an embodiment of the present disclosure.

The technology described herein generates routing decisions for customer support requests received from users of a software platform. The routing decisions are generated using a hybrid model that includes a data driven deep learning component and a rules-based business logic component. The hybrid model generates routing decisions based on word and sentence features extracted from the text of customer service requests and other user inputs and context features extracted from other data sources that provide insight into the user inputs. The routing decisions are consumed by a support platform that routes the customer requests to support queues based on the routing decisions generated by the hybrid model.

The hybrid model framework streamlines routing decisions for customer service requests. The hybrid model integrates deep learning models with business logic to provide a simplified model framework that is less expensive to operate and easier to maintain. The hybrid model implementation includes fewer endpoints, a smaller code base, and simpler routing rules relative to implementations that include ensembles of multiple machine learning and business logic-based models. Training and serving one hybrid model reduces hosting and operating costs of the support routing system and the amount of compute resources required by the support routing system. Additionally, the smaller code base of the simplified hybrid model implantation is easier to manage, troubleshoot, and upgrade relative to more complex model implementations.

Despite the reduction in compute resources, the hybrid model generates routing decisions faster and more accurately relative to ensemble model approaches. The contact types generated by the hybrid model are detailed routing decisions based on multiple routing predictions. The multi-channel output of the deep learning component allows the hybrid model to consider more aspects of the context of the customer service request relative to other routing systems. The additional context information enables the support routing system to route user requests that include difficult questions that previously required manual review before routing. The additional context information also enables the support routing system to more accurately and more precisely determine the complexity of the user requests. The ability of the support routing system to distinguish simple questions from complex questions reduces the operating costs of the support platform by shifting a greater number of simple questions to cheaper associates and minimizing the use of more expensive credentialed experts.

The improved routing accuracy provided by the support routing system reduces the average handling time for user requests. The support routing system consistently routes requests to the correct support group (e.g., the support group optimized to handle the intent and complexity of the request) to reduce the number of times a request has to be re-routed manually and minimize the amount of time required to resolve each request. The faster handling time for user requests results in an improved user experience and increases the confidence users have in the information service. Accordingly, the disclosed technology enhances user experience by reducing handling time for user requests and improving the accuracy of routing predictions. The disclosed technology also improves the functioning of computer systems by reducing the training time, hosting costs, operating costs, and compute resources required to generate routing decisions using machine learning techniques.

FIG. 1 shows an example of a system 100 configured to implement a process for generating routing predictions for a user input 154 (e.g., question, keyword search, and the like) and context in accordance with the disclosed principles. The routing predictions may include classifications or other outputs that predict user intent, the support group best equipped to handle the request included in the user input, the queue within the support group that receives the request, and the contact channel for connecting with the user. The intent predictions may include a category, context, or other description of information the user is attempting to access via the user input 154 and or information required to resolve user requests, problems, and or issues included in the user input 154. For example, intent predictions may include a classification that identifies the user input 154 as including product related requests, tax related requests, tax advice requests, and the like. The support group predictions and queue predictions determine a particular support group and sub-group of staff within the support group that is best equipped to handle user requests having the predicted intent. Support group predictions and queue predictions can be based on the complexity of the request included in the user input 154 and the proficiency and skill of the agents included in the support group and or subgroup assigned to the predicted queue. Channel predictions identify the contact medium (e.g., call, video chat, email, instant message, text message, and the like) for contacting the user in order to address the request included in the user input. The system 100 receives predictions from each of these four channels and generates a contact type prediction based on the four routing predictions.

The system 100 may include a first server 120, second server 130, and or one or more client devices 150. First server 120, second server 130, and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

First server 120 may be configured to implement a first service 122, which in one embodiment may be used to generate features and or routing predictions from user input 154 and or context associated with the user input 154. The user input 154 captured in the user interface (UI) 152 of the one or more client devices 150 may be transferred to the first service 122 via the network 140 and stored in one or more databases 124, 134, the second server 130 and or client device(s) 150. The first server 120 may execute processes that extract one or more features (e.g., text features, context features, and the like) from the user input 154 and or associated context and generate an intent prediction for each piece of user input 154 based on the one or more features. The first server 120 may extract one or more features and or generate the routing predictions using one or more multi-channel machine learning models. The multi-channel machine learning models are integrated with a business logic component to form a hybrid model that generates routing predictions based on an output from the multi-channel machine learning models and business rules included in the business logic component. The hybrid model, the multi-channel machine learning models, and the business logic component can be stored in the first database 124 or second database 134, and or received from second server 130 and or client device(s) 150.

First service 122 or second service 132 may implement an information service, which may include a variety of products for managing data and providing functionalities to streamline workflows related to people, businesses, and other entities. The information service may be any network 140 accessible service that maintains financial data, medical data, personal identification data, and or other data types. For example, the information service may include Quick-Books® and its variants by Intuit® of Mountain View California. The information service may provide one or more features that use the structured form representations and structured metadata generated by the system 100. The information service can include a support platform that provides customer service to users of the information service.

The support platform can consume routing predictions and or contact type predictions generated by the first server 120 to enhance a user experience for one or more of the products included in the information service. For example, the support platform may generate personalized answers in response to user questions based on the predicted intent and other routing predictions for each user request to provide a unique user experience. The support platform may also use the contact type predictions to route user requests to a tax expert handling requests related to high complexity tax issues through video chats, a product support group handing requests related to one or more features of the information service through instant messaging, or other contact types that specialize in the type of issues related to the predicted intent for each request. The contact type predictions enable more efficient routing to agents to ensure users get better information about their specific issue in less time. The contact type predictions are also more detailed (e.g., contact types can route to a specific agent within a specific support group that connects with users through a particular channel) to account for user preferences, real time platform conditions (e.g., wait times, demand for certain support groups, performance of agents currently working, and the like), request complexity, and agent proficiency. These more detailed contact type predictions improve the overall user experience and streamline the operation of the support platform.

Client device(s) 150 may be any device configured to present user interfaces (UIs) 152 and receive user inputs 154. The UIs 152 may be configured to display a response 156 to each user input. The responses 156 may include, for example, personalized answers, call queue confirmation, contact information of an appropriate subject matter expert, or other outputs generated based on the routing predictions and or contact type predictions generated by the first server 120. The UIs 152 may also capture session data including UI screen id, product id (e.g., product SKU), input text/product language, geography, platform type (i.e., online vs. mobile), and other context features that may be used to generate intent predictions. Exemplary client devices 150 may include a smartphone, personal computer, tablet, laptop computer, or other device.

First server 120, second server 130, first database 124, second database 134, and client device(s) 150 are each depicted as single devices for ease of illustration, but those of ordinary skill in the art will appreciate that first server 120, second server 130, first database 124, second database 134, and or client device(s) 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client device(s) 150.

Figure 2:
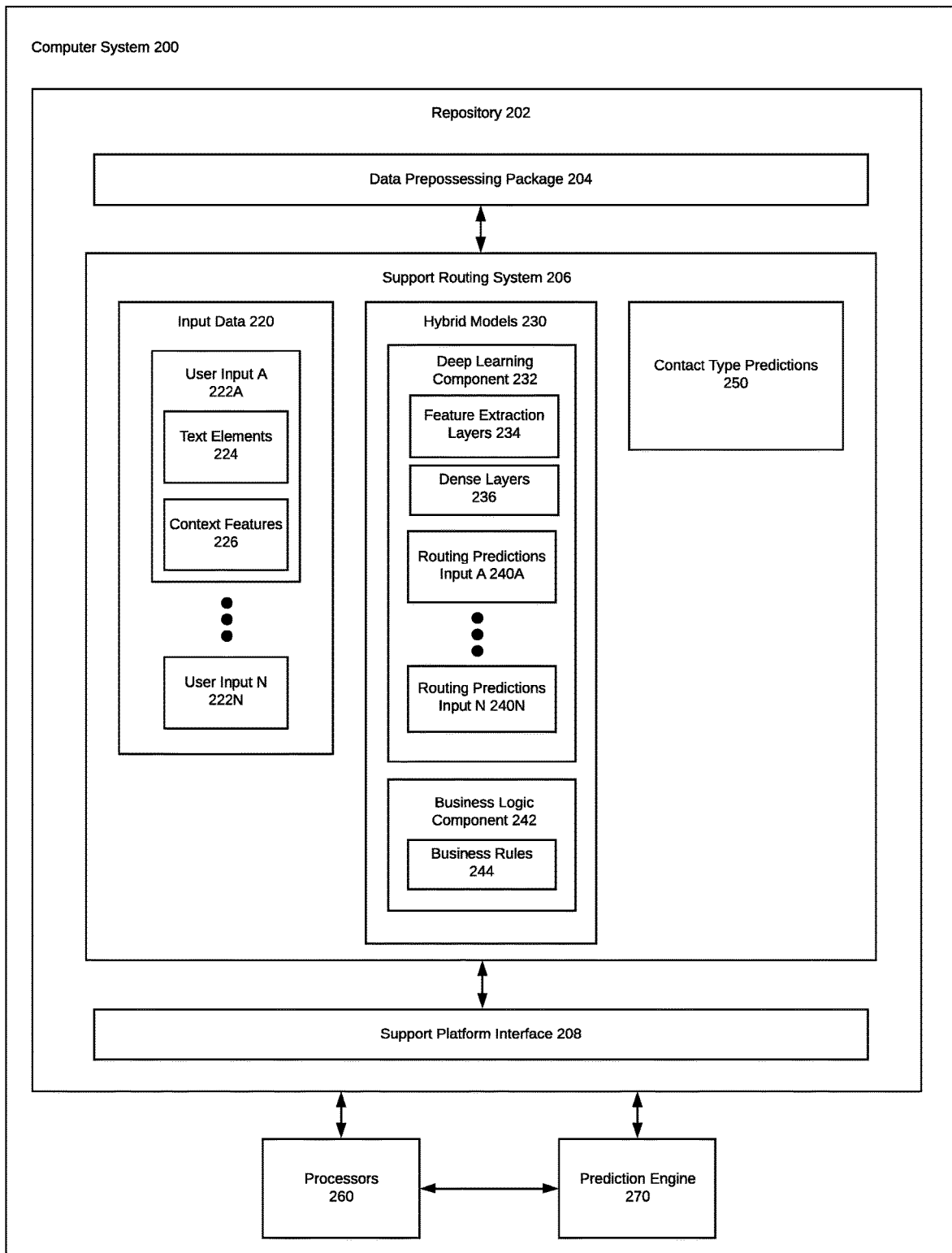
FIG. 2 shows more details of the system of FIG. 1 according to an embodiment of the present disclosure.

FIG. 2 is a block diagram illustrating an example computer system 200 in accordance with one or more embodiments disclosed herein. As shown in FIG. 2, the computer system 200 includes a repository 202, a prediction engine 270, and one or more computer processors 260. In one or more embodiments, the computer system 200 takes the form of the computing device 500 described in FIG. 5 and the accompanying description below or takes the form of the client device 150 described in FIG. 1. In one or more embodiments, the computer processor(s) 260 takes the form of the computer processor(s) 502 described in FIG. 5 and the accompanying description below.

In one or more embodiments, the repository 202 may be any type of storage unit and/or device (e.g., a file system, database, collection of tables, or any other storage mechanism) for storing data. Further, the repository 202 may include multiple different storage units and/or devices. The multiple different storage units and/or devices may or may not be of the same type or located at the same physical site. The repository 202 may include a data preprocessing package 204, a support routing system 206, and a support platform interface 208.

The data preprocessing package 204, manipulates user inputs to facilitate feature extraction and other processing steps performed by the support routing system 206. The data preprocessing package 204 may receive one or more strings of text or other user input from a client device. The user input may be received as an HTML, XML, a JSON or other structured data format that includes strings of text and other text data as well as session data. The session data may include context information that describes the product, language, geography, UI screen, and other context information related to the user input and or strings of text included in the user input. The data preprocessing package 204 parses the received input to tokenize each word and separate punctuation and other elements of the received text string. The data preprocessing package 204 cleans the received text string by removing any HTML tags or other artifacts of the markup language format used to transfer the text string. Cleaning the received text sting, prevents superfluous tags and other markup language artifacts that persist in the received text string from being input into the hybrid models 230. These extraneous tokens can add unnecessary parameters to the hybrid models 230 and reduce the performance and or accuracy of the hybrid models 230.

The data preprocessing package 204 standardizes the tokenized text string by replacing symbols and other non-alpha numeric tokens (e.g., currency symbols, links and other URLtokens, percent symbols, and the like) with a standard token. For example, the data preprocessing package 204 may replace currency tokens with <curr>, percent tokens with <perc>, and URL tokens with <link>. The data preprocessing package 204 may also replace acronyms such as state names, country names, and the like in the text string with their full forms to ensure strings including the acronym are treated the same as strings including the full form text. To replace the acronyms, the data preprocessing package 204 uses an acronym mapping file that lists a vocabulary of popular acronyms and their full forms. The data preprocessing package 204 may also convert capitalized proper noun tokens, words in all caps, tokens including the first word in a sentence, and all other capitalized tokens to lower case text. Standardizing capitalization ensures the hybrid models 230 recognize capitalized and uncapitalized forms of the words as having the same meaning. The data preprocessing package 204 also replaces periods, commas, question marks, and other punctuations include in the text string with blank white spaces to ensure tokens including the same word with and without a punctuation mark are treated the same by the hybrid models 230. The data preprocessing package 204 also removes stop words from the text strings. Stop words can include words that are very commonly used in the English language (e.g., "I", "me", "and", and the like). Removing the stop words reduces the size of the text strings to make it easier for the hybrid models 230 to ingest a larger corpus of text data. Each of the text standardization operations ensures that the output string generated by the data preprocessing package 204 retains all of the useful information included in the received text string without adding unnecessary parameters to the hybrid models 230 that can reduce the model's performance and or accuracy.

The data preprocessing package 204 also modifies one or more tokens included in the received text string to improve the quality of data input into the hybrid models 230. For example, the data preprocessing package 204 may execute one or more spell check modules to correct the spelling of the words included in the received text string. The spell check modules can check for spelling errors by reviewing the text strings against a corpus of correctly spelled English terms extracted from e.g., Wikipedia and the correct spellings of a custom selection of domain specific terms. For example, domain specific terms related to a particular field (e.g., tax, finance, law, medicine, business, and the like) and or terms that are common in current events (e.g., terms that refer to new law or regulations, "covid", "covid-19", and other terms that refer to a pandemic, natural disaster, or other global event, "turbotax" and other terms that refer to a particular product or tool present in a particular domain, and the like). Domain specific terms can also be standardized by the data preprocessing package 204. For example, tokens included in the received text string may be checked against a database of domain specific terms including, for example, tax form names, tax form field names, government institution names, and other common key words found in previously submitted user input text (e.g., "turbotax", "covid", and the like). The data preprocessing package 204 may identify instances of these terms and convert them to a standardized format. For example, the data preprocessing package 204 may convert all instances of form name "1099 int" (i.e., the US federal form for reporting interest income) including "1099INT", "1099-Int", and the like to "1099int". Correcting spelling and standardizing domain specific terms enables output strings generated by the data preprocessing package 204 to capture all of the text information that may be relevant to the string's intent regardless of user error and the use of uncommon, specialized terms.

The data preprocessing package 204 also aggregates information from session data, temporal data, and other data sources to facilitate the extraction of context features 226. Session data captured during a browser session including interactions between a user and the information service can be mined for context features 226, including temporal context features and user context features. Temporal context features, including the day of the week that the user accessed the information service and the time of day the user accessed the information service, are extracted by the data preprocessing package 204 from session data. Other user context features related to user interactions with the information service can also be extracted from session data. For example, product SKU, user account type, payment method, screen id visited, user id, product id, geography, language, platform type, and other elements captured in the session data for the user session. The user context data can also be extracted from data collected from the devices (e.g., smartphones, laptops, and the like) used by users to interact with the information service. For example, the user context data from device interactions may include language preferences, the location of the device, device communication capabilities (e.g., whether the device is a smart phone that can receive calls and text messages or a laptop with a webcam and can receive video chats and instant messages), and the like. The data preprocessing package 204 can also aggregate user context information from other data associated with the user that is collected by the information processing platform. For example, tax information including entitlements, previous tax filings, current filing status, tax filing jurisdictions, and other tax information previously collected by the information processing system. The data preprocessing package 204 can tokenize, clean, standardize, and or modify any of the text strings included in the extracted user context features and or temporal features. For example, the data preprocessing package 204 cleans string values extracted from session data by removing prefixes or tags that persist due to parsing session data formatted in HTML, XML, JSON, or other markup languages.

The data preprocessing package 204 also preprocesses numeric and or categorical temporal context features and or user context features. For example, the data preprocessing package removes missing, null, or not a number (NAN) values from the data. The data preprocessing package 204 can also normalize the numeric features so that each of the numeric values is interpreted relative to the same scale. The data preprocessing package 204 may also execute hotfixes or other ad hoc logic to encode strings and other text as context features 226 that include vectors or other numerical representations. The data preprocessing package 204 may manipulate the context features post generation to facilitate processing by the support routing system 206. For example, if the matrix including generated context features 226 is too sparse, the data preprocessing package 204 may select only the top "k" screens (i.e., screens that appear most frequently) and treat all other screen id values as null. The data preprocessing package 204 may output context features in an array, list, or other data structure that can be input into the hybrid models 230.

Received text strings and other user inputs manipulated by the data preprocessing package 204 may be provided to the support routing system 206 as input data 220. The input data 220 may include a plurality of user inputs 222A, ..., 222N, for example questions, search queries and other inputs that have been processed by the data preprocessing package 204. Each of the user inputs 222A, ..., 222N includes a plurality of text elements 224 and or context features 226. The text elements 224 may include words, symbols, specialized terms and other tokens generated by the data preprocessing package 204. The context features 226 may include temporal context features and or user context features extracted from session data, device interaction data, and or other data collected by the information service.

The support routing system 206 includes one or more hybrid models 230 that receive input data 220 as input and generate contact type predictions 250 as output. The hybrid models 230 may include a deep learning component 232 that generates routing predictions 240A, ..., 240N for each user input. The routing predictions 240A, ..., 240N are input into the business logic component 242 that generates contact type predictions based on business rules 244. The deep learning component 232 is used to implement a variety of deep learning classifiers and other deep learning models. Deep learning classifiers implemented by the deep learning component 232 can include, for example, neural network classifiers (based on convolutional neural networks (CNNs)), random forest classifiers, SGD classifiers, lasso classifiers, gradient boosting classifiers, bagging classifiers, adaptive boosting classifiers, ridge classifiers, elastic net classifiers, NuSVR classifiers, and the like. Deep learning, also known as deep structured learning or hierarchical learning, is part of a broader family of machine learning methods based on learning data representations, as opposed to task-specific algorithms. Exemplary implementations are discussed in more detail below.

As shown in FIG. 2, the machine learning models implemented by the deep learning component 232 include a plurality of layers. For example, the plurality of layers includes one or more feature extraction layers 234 and one or more dense layers 236 connected to the feature extraction layers 234. The feature extraction layers include, for example, word feature extraction layers, sentence feature extraction layers, and the like that generate quantitative representations of text data included in the user inputs 222A, ..., 222N. The feature extraction layers 234 may generate word features, for example, vectors, embeddings, or other representations of words included in user inputs 222A, ..., 222N. The feature extraction layers 234 may generate word features including vector representations of words determined using one or more statistical formulas, heuristics, or other algorithms. For example, word features may include vector representations that reflect the important of a particular term within a particular corpus or library of terms determined using term frequency-inverse document frequency (TF-IDF) algorithms.

To more efficiently represent words (i.e., reduce the dimensions of the vector space needed to represent a sentence or collection of words) and more accurately capture the meaning and or context of each word, the feature extraction layers 234 can generate word embeddings (e.g., Word2vec embeddings) that may be used as word features. The word embeddings may include a learned representation of text that reflects the meaning of a word as the word is used within the user input. One or more word embeddings may be generated for each word included in the user input.

The text embedding layers or other feature extraction layers 234 for generating the word embeddings are pre-trained on a large corpus of documents or other text data. In one or more embodiments, the corpus can be specialized to a particular context (e.g., a tax corpus, financial data management corpus, a medical corpus, an income tax filing corpus). The text embedding layers are pre-trained on a large corpus of many different document types. The text embedding layers are then fine-tuned on a more specific specialized corpus that is related to the context of the user inputs analyzed by the hybrid models 230. For example, the text embedding layers included in the feature extraction layers 234 are pre-trained on a large corpus of hundreds, thousands, or even millions of documents related to a wide variety of subject matters. The pre-trained text embedding layers are tuned using a specialized corpus, including documents related to a particular subject matter (e.g., tax information). Relative to the large corpus, the specialized corpus can have a smaller number of total documents, but greater number of documents related to the particular subject matter (e.g., tax information). Context features 226, intent predictions, and other input and or outputs of the hybrid models can be used to select a particular specialized corpus to train and or fine tune pre-trained word embeddings. The word embeddings generated by the text embedding layers may encode the context and other relationships between words found in the training corpus. For example, generic relationships including male-female relationships between terms like king and queen, verb-tense relationships, country-capital relationships may be captured in the word embeddings. Specific word relationships distilled from a specialized corpus, for example, a tax corpus may also be captured in word embeddings. Specific word relationships included in word embeddings may include relationships between forms (e.g., 1099) and fields in the forms, relationships between form fields and the words included in the description of the fields (e.g., salary, wages, and tips), and the like.

Word2vec embeddings are word features that represent the words included in a sentence in vectors other quantitative representations. Word2vec embeddings may represent the text more efficiently relative to text embeddings generated using other techniques. For example, Word2vec embeddings can represent a sentence in a 300 dimension vector relative to a 1000 dimension vector that is required to represent a sentence using TF-IDF embeddings. Word2vec embeddings can also be pre-trained and can handle previously unseen words that have similar meanings or a relationship with a word in the training corpus. Therefore, text embedding layers that implement Word2vec approaches reduce the training time required to generate word embeddings relative to TF-IDF approaches which require re-training the text embeddings layers from scratch each time a set of word features is generated. Additionally, Word2vec word embeddings capture information from more terms relative to TF-IDF word embeddings which only encode terms that are included in the training corpus.

The feature extraction layers 234 may also process word embeddings and other word features to generate sentence embeddings and other sentence features that include sentence level representations of user inputs 222A, . . . , 222N. The feature extraction layers 234 generating the sentence features may be implemented as any neural network (NN) or other model layers that extract meaningful information about the structure, arrangement, context, and or other features of the individual word features of a sentence included in the user inputs 222A, . . . , 222N. For example, the feature extraction layers 234 may include sentence level text embedding layers that aggregate, average, or determine other statistical measurements for the word embeddings to generate sentence features. The feature extraction layers 234 may also include long term short term memory (LSTM) layers, convolution layers, and other NN layers that may output sentence features that include a meaningful sentence representation.

The machine learning models of the deep learning component 232 may include one or more dense layers 236. The dense layers 236 can be part of a NN or other model architecture. Each of the one or more dense layers 236 may include a plurality of neurons that receives multiple inputs and produces an output. To produce the output each of the neurons may apply a function to the inputs. For example, each of the neurons may apply a liner function to the inputs that multiples the inputs by one or more weights and adds a bias term to the product of the inputs and the weights. The dense layers 236 are connected to each other so that the outputs generated by the previous dense layer are received as inputs by the next dense layer. The weights are trainable parameters that are used to interpret the inputs received by the dense layers 236 (e.g., features generated by the feature extraction layers and or outputs from the previous dense layer). The trainable parameters may be learned using a training process that adjusts the weights of each of the dense layers to minimize a loss function. After an epoch of training, the dense layers 236 may be used to generate an output for making a prediction. If the prediction generated from the output is within an acceptable accuracy threshold then the training may be completed. If the prediction generated from the output is outside an acceptable accuracy threshold then the weights of each of the dense layers maybe updated using a backpropagation loop or other mechanism for implementing gradient weight updates.

To generate the routing predictions 240A, . . . , 240N, the output of the dense layers 236 may be fed into one or more classification layers. The classification layers may include a plurality of prediction classes for each of the four model channels. For example, a set of prediction classes that correspond to different intent predictions, a set of prediction classes that correspond to different support group predictions, a set of prediction classes that correspond to different queue predictions, and a set of prediction classes that correspond to different contact channel predictions. The classification layers may include 30 different model classes for intent predictions with each class corresponding to a particular type of information required to resolve a particular user request expressed in a particular user input. The classification layers may receive the outputs of the dense layers 236 as input and generate routing predictions 240A, . . . , 240N as output. To generate the routing predictions 240A, . . . , 240N, the classification layers may compare the received features (e.g., the word features, sentence features, and or context features) to features derived from the training data. The features derived from the training data may include a plurality of sets of features including a set of features for each class of intent prediction, support group prediction, queue prediction, and contact channel prediction included in the training dataset.

To generate the contact type predictions 250, the routing predictions 240A, . . . , 240N are fed into the business logic component 242. The business logic component 242 includes business rules 244 and other ad hoc logic that can modify and or override the routing predictions 240A, . . . , 240N under certain conditions. Exemplary business rules 244 may include keyword-based business rules that predict a pre-defined contact type for user inputs 222A, . . . , 222N that include particular keywords. For example, user inputs 222A, . . . , 222N including "cpa", "expert", "k-1", "irs", and other tax advice keywords may be given a tax expert contact type prediction regardless of the routing predictions 240A, . . . , 240N for the user inputs 222A, . . . , 222N generated by the deep learning component 232. Business rules 244 can also be threshold based. Threshold based business rules 244 require routing predictions 240A, . . . , 240N generated by the deep learning component 232 to meet a particular confidence score threshold before it can be used to impact the contact type predictions 250. If one or more of the routing predictions 240A, . . . , 240N fail to meet or exceed the particular confidence score, a default contact type prediction 250 is returned by the business logic component 242. Other business rules 244 include intent based business rules 244. The intent based business rules 244 generate a particular contact type prediction 250 based on the intent predictions generated by the deep learning component. For example, user inputs classified as having a login intent can receive an instant message support group contact type from the business logic component 242. Availability and or wait time business rules 244 are also used to generate contact type predictions 250 based on the real time traffic on the support platform. For example, if the wait time for phone call contact channels is above a particular wait time threshold (e.g., 30 mins or any other length of time), the business logic component 242 may generate a contact type that does not include a phone call contact channel.

Contact type predictions 250 generated by the support routing system 206 are consumed by the support platform. The support platform may be implemented in, for example, an information service included in a software application. The support platform interface 208 may include an API or other interface that communicates with the support routing system 206 to, for example, receive contact type predictions and or performance data and other information required to determine metrics used to evaluate the support routing system 206.

The support platform may receive contact type predictions 250 via the support platform interface 208 and, in response, route a user request to a particular queue. The queues receiving the user requests routed by the support routing system 206 are optimized for the particular intent of the user request and the preferences of the user making the request that can be inferred from the context of the user input including the request. The support routing system 206 also routes user requests based on the performance of handling agents and or real time availability metrics and other current conditions of the support platform. Accordingly, the support routing system 206 can implement performance based routing for complex tax problems and other requests that typically require human review. The support routing system 206 can also streamline request routing to improve user experience by reducing the response time to user requests. The support routing system 206 can also simply the routing process by reducing the number of machine learning models required to generate contact type predictions from 4 (e.g., 1 per routing prediction) and or 2 (e.g., 1 model for intent predictions and 1 model for support group, queue, and contact channel predictions) to 1 multi-channel model that generates all four predictions. Reducing the number of machine learning models reduces the cost of operating routing infrastructure while also increasing accuracy of routing decisions.

The prediction engine 270 may include functionality to operate the hybrid models 230 that generate one or more predictions, for example, contact type predictions 250. The prediction engine 270 may also include functionality to replace and or update input data 220, hybrid models 230, the support routing system 206, the support platform interface 208, and or the data preprocessing package 204 stored in the repository 202. The computer processors 260 may include functionality to execute the prediction engine 270. The prediction engine 270 may be implemented in hardware (e.g., circuitry), software, firmware, and/or any combination thereof.

Figure 3:
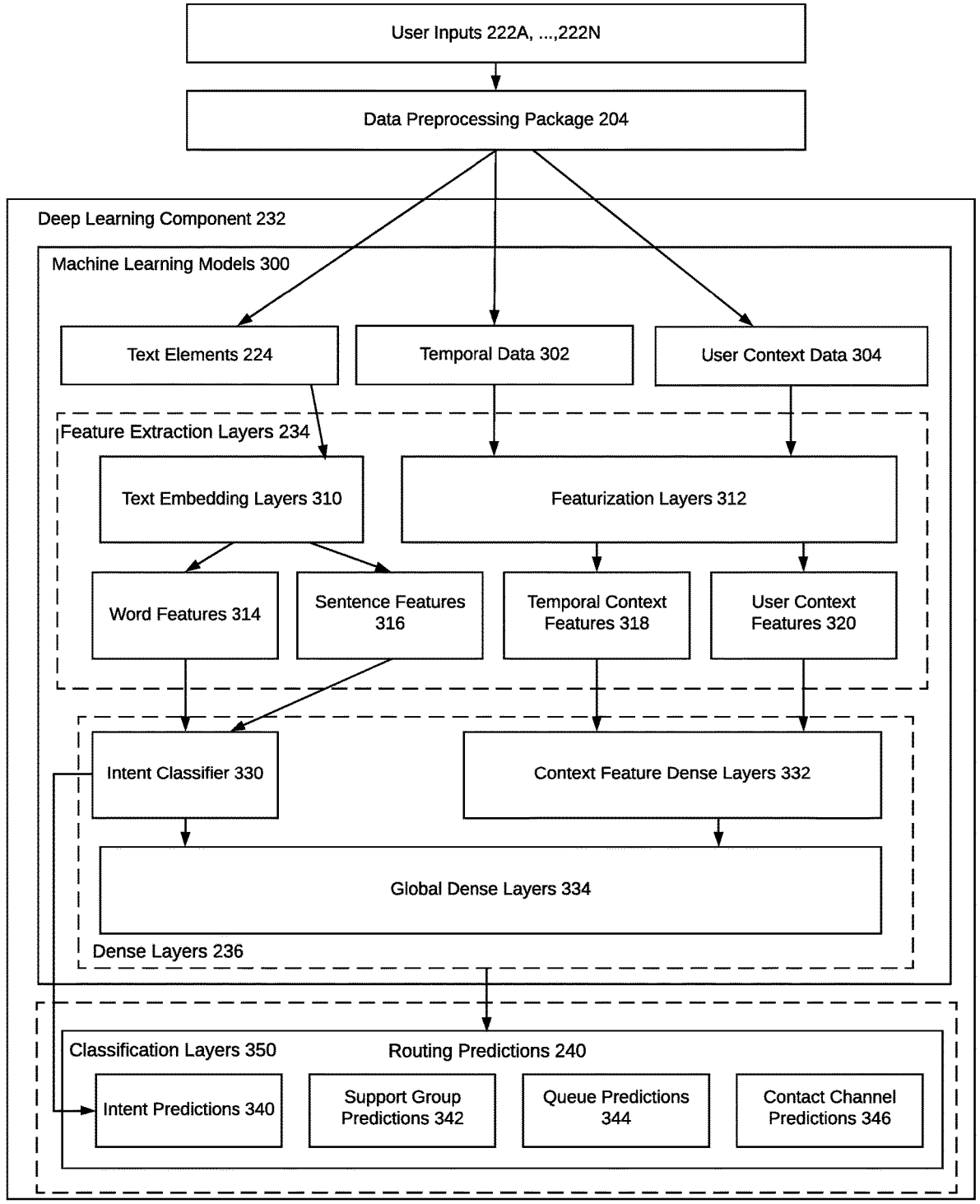
FIG. 3 shows more details of the deep learning component of FIG. 2 according to an embodiment of the present disclosure.

FIG. 3 illustrates more details of the deep learning component 232. As shown, user inputs 222A, . . . , 222N are received by the data preprocessing package 204. The user inputs 222A, . . . , 222N may include questions, search queries and other text strings submitted by users as well as session data including the product and or UI screen used to submit the user inputs 222A, . . . , 222N and other data used to derive context features. As described above, the data preprocessing package 204 cleans, standardizes, and or modifies the user inputs 222A, . . . , 222N to extract text elements 224 (i.e., words and other tokens) for each of the user inputs. The user inputs 222A, . . . , 222N also include temporal data 302 and user context data 304. The temporal data 302 is used to determine the time users access the information service and extract other temporal context features 318. The user context data 304 includes session data, device interaction data, and other information (e.g., user tax information, user financial information, and the like) collected by the information service. The user context data 304 is used to derive the user context features 320.

The text elements 224, user context data 304 and temporal context data 302 output by the data preprocessing package 204 are received by the machine learning models 300 of the deep learning component 232. The text elements may be fed into one or more text embedding layers 310 to generate word features 314. The word features 314 generated by the text embedding layers 310 may include statistical measurements, word embeddings, vectors and other numerical representations of the words included in the user inputs 222A, . . . , 222N. As described above, the text embedding layers 310 may generate word features 314 using one or more statistical formulas, heuristics, algorithms, or feature generation techniques, for example, TF-IDF, Word2vec embeddings, and the like. For example, the text embedding layers 310 may include one or more pre-trained Word2vec embedding layers that generate word embeddings for each of the text elements 224. The Word2vec text embedding layers 310 may be pre-trained on a large corpus of hundreds, thousands, or even millions of documents related to a wide variety of subject matters. The Word2vec text embedding layers 310 may then be tuned using a specialized corpus including documents related to a particular subject matter (e.g., tax information). Relative to the large corpus, the specialized corpus may have a smaller number of total documents, but a greater number of documents related to the particular subject matter (e.g., tax information).

Sentence features 316 are fed into the sentence feature extraction layers included in the text embedding layers 310 to generate statistical measurements, vectors, and other numerical representations of sentences and other groups of words included in the user inputs 222A, . . . , 222N. The text embedding layers 310 may include NN layers and or any other model layers that extract meaningful information from the word features 314 to generate sentence features 316 including a learned representation of the user input. For example, the sentence feature extraction layers may include a max pooling layer that determines the maximum word embedding value for each individual word included in the user inputs 222A, . . . , 222N and outputs a sentence embedding or other sentence feature 316 that includes the maximum word embedding value for each word in the sentence.

The temporal data 302 and the user context data 304 are fed into one or more featurization layers 312 that generate temporal context features 318 and user context features 320. The user context features 320 can include UI screen id, product SKU, product language, geography, tax context features and other domain specific context features generated from data collected by the information service, device interaction features, and other features derived from the user context data 304. Temporal context features 318 can include the day of the week the user accessed the information service and the time of day the user accessed the information service, and other timing data that may be used to determine the availability, wait times, and other real time conditions of the support platform and or information service.

The featurization layers 312 may be pre-trained on a global dataset including user context data and financial data, tax data, product data, and other data related to the user request. The global dataset used to train the featurization layers 312 may include data on hundreds, thousands, or even millions of users having a wide variety of user profiles. For example, the global dataset may include data on users having different sizes, different amount of transactions, different industries, different tax filing status, different tax filing jurisdictions, different amounts of revenue and other accounting metrics, different devices used to access the information service, different product subscriptions, different product use patterns, and the like. The featurization layers 312 may then be tuned using a specialized dataset including users that have similar profiles to the user submitting the user request. Relative to the global dataset, the specialized dataset may have data associated with a smaller number of total users, but a greater number of users related to the particular user submitting the user request.

To generate the multi-channel output, the dense layers 236 of the machine learning models 300 receive the word features 314, sentence features 316, temporal context features 318, and user context features 320 from the feature extraction layers. The dense layers 236 may include an intent classifier 330, context feature dense layers 332, and global dense layers 334. The intent classifier 330 includes one or more dense layers or other NN layers that generate a model output based on the word features 314 and sentence features 316 generated from the input text. The dense layers are fully connected layers that interpret the word features 314 and sentence features 316 by multiplying the values for the vectors included in the word and sentence features by learned weights or other parameters stored in each neuron of the dense layers. The number of dense layers and other NN layers included in the intent classifier 330, may be a hyperparameter that may be tuned to control the learning process during model development. To generate the intent predictions, one or more classification layers map the output of the dense layers to an intent class. To perform the mapping, the classification layers may learn relationships between different word features 314, sentence features 316, and input classes. These relationships may be represented as features of input classes distilled from training data. The training data may include user inputs 222A, . . . , 222N labeled with the correct intent classification/prediction. Additionally, weights may be applied to each input class based on the number of user inputs classified in each class. For example, input classes may be weighted using equation 1 below.

$$\text{weight}[i] = \frac{\#\text{total samples}}{\#\text{classes} \times \#\text{ samples in class } i} \quad 1)$$

Values for each input class can be determined by the intent classification layers for the text included in each user input based on the comparison between the model features of each class derived from the training data, the outputs from the dense layers, and the class weights. Implementations of the intent classifiers 330 can be incorporated into supervised and unsupervised machine learning models 300. For example, the intent classifiers 330 are implemented as part of a binary and or multiclass logistic regression model. The intent classifiers 330 can also be implemented as part of feed forward neural networks, memory networks, convolutional neural networks, and or question and answer ranking networks. Memory networks may use the content of personalized answers generated for each intent classification to improve predictions. The personalized answers are stored in memory and function as an attention mechanism that allows the network to focus more on words in the user input having a strong relationship to words in the personalized answers. The question and answer ranking approach uses one or more convolution layers to extract features from input text elements at an n-gram level to understand the context of the words included in the user input 222A. The dense layers included in the intent classifier 330 use the extracted features to output a match score. The score may match an input to an intent class and or an intent class to personalized answers that are displayed to users in response to questions, search queries, or other inputs having a particular intent prediction.

To generate the context model output used to derive the support group predictions 342, queue predictions 344, and the contact channel predictions 346, the temporal context features 318 and user context features 320 are fed into context feature dense layers 332. The context feature dense layers 332 can be fully connected layers or other NN layers that combines the temporal context features 318 and user context features 320 to generate a context output. To generate the context output, the context feature dense layers 332 may interpret the temporal context features 318 and the user context features 320 by multiplying the values for the vectors or other numeric representations of the context features by learned weights or other parameters stored in each neuron of the context feature dense layers 332. The number of fully connected layers and other NN layers included in the context feature dense layers 332 can be a hyperparameter that may be tuned to control the learning process during model development.

The context feature dense layers 332 may concatenate the temporal context features 318 and user context features 320 to generate a model output that combines all of the context features and the learned interpretation of the context features into a normalized output that may be fed into the global dense layers 334. Concatenating the temporal context features 318 and the user context features 320 generates a context output that encodes all of the meaningful information extracted from the temporal data and user context data for each of the user inputs 222A, . . . , 222N into a numeric output that may be efficiently processed by the global dense layers 334. The context output generated by the context feature dense layers 332 may be a multi-dimension vector including a number of dimensions that corresponds to the number of neurons included in the last context feature dense layer that processes the input data during production of the model output.

To generate the support group predictions 342, the queue predictions 344, the contact channel predictions 346, and other multi-channel predictions, the context output from the context feature dense layers 332 and the model output from the dense layers of the intent classifier 330 are input into the global dense layers 334. The global dense layers 334 can be fully connected layers or other NN layers that process the model output generated from the text features and the model output from the context features to generate a multi-channel model output that is used to generate the support group predictions 342, queue predictions 344, and contact channel predictions 346. To generate the multi-channel model output, the global dense layers 334 interpret the model output from the intent classifier 330 and the context output from the context feature dense layers 332 by multiplying the values for the multi-dimensional vectors or other numeric representations of the model outputs by learned weights or other parameters stored in each neuron of the context feature dense layers 332.

The number of fully connected layers and other NN layers included in the global dense layers 334 can be a hyperparameter that may be tuned to control the learning process during model development. The global dense layer 334 may generate multiple multi-channel model outputs that may be fed into prediction specific classification layers to generate different predictions. The multi-channel outputs are based on inputs (e.g., the model outputs from the intent classifier 330 and the context feature dense layers 332) that combine the word features 314, sentence features 316, temporal context features 318, and user context features 320 to generate a model output that combines a learned interpretation of the text features and context features included in the input into a normalized output that may be fed into one or more classification layers 350. Combining the outputs generated based on the text features and the context features into a normalized output ensures that all of the meaningful information extracted from the word features 314, sentence features 316, temporal context features 318, and user context features 320 for each of the user inputs 222A, . . . , 222N is encoded in a numeric output that may be efficiently processed by the classification layers 350. The model output generated by the global dense layers 334 may be a multi-dimension vector including a number of dimensions that corresponds to the number of neurons included in the last global feature dense layer that processes the input data during production of the model output.

The multi-channel model output from global dense layers 334 is input into the classification layers 350 to generate the multi-channel predictions. To generate the multi-channel predictions, one or more classification layers map the output of the global dense layers 334 to a prediction class. Each of the multi-channel predictions may be generated by a different classification layer. For example, the support group predictions 342 can be generated by a support group classification layer that maps the multi-channel model output to a set of support group classes, the queue predictions 344 can be generated by a queue classification layer that maps the multi-channel model output to a set of queue classes, the contact channel predictions 346 can be generated by a contact channel classification layer that maps the multi-channel model output to a set of contact channel classes. To perform the mapping, the classification layers may learn relationships between the different text features and context features included in the multi-channel model output and the set of classes that corresponds to a particular prediction. These relationships may be represented as features of the classes distilled from training data. The training data may include user inputs 222A, . . . , 222N labeled with the correct class/prediction. The routing predictions 240 generated by the classification layers 350 are fed into the business logic component to determine the contact types.

The hybrid model framework shown in FIGS. 2-3 streamlines routing decisions for customer service requests. The hybrid model 230 integrates data driven deep learning models with rules-based business logic to provide a simplified model framework that is less expensive to operate and easier to maintain. The hybrid model 230 implementation includes fewer endpoints, a smaller code base, and simpler routing rules relative to implementations that include ensembles of multiple machine learning and business logic based models. The hosting cost of the hybrid model 230 is 85% below the industry baseline and requires far fewer compute resources to operate. For example, a large support platform using the hybrid model 230 to process hundreds or thousands of customer service requests per day would require only 2 compute resources to host and operate. This is a tenfold reduction compared to the 20 or more compute resources required to host and operate a support platform that uses ensemble implementations including multiple models to route customer service requests.

Despite the reduction in compute resources, the hybrid model 230 generates routing decisions faster and more accurately relative to ensemble model approaches. The multi-channel output of the deep learning component 232 generates multiple routing predictions using one model. Ensemble model frameworks require a separate model for each prediction, therefore they require additional compute resources to train and host the additional models. Each model included in the ensemble model framework also generates different class predictions that must be mapped to queues based on headings, topics, and other keywords included in the classes. Each model included in the ensemble may predict inputs into one of tens or hundreds of different classes. Therefore, to route requests to queues, the support platform would need to interpret hundreds of different class combinations to determine which queue routes to the agents that can handle the particular request. Routing decisions made by the hybrid model 230 are based on simplified routing rules that include a fewer number of queues (e.g., the contact type queues that correspond to the predicted contact type for each user request). The routing decisions made by the hybrid model 230 are also "direct to queue" in that the queue that receives a routing request is determined based on the contact type predicted by the hybrid model 230 and not based on a mapping between a queue and the different combinations of class predictions generated by different models. Therefore, the direct to queue routing provided by the hybrid model 230 does not require combining multiple queues and or classes from different models or extracting keywords and other mapping information from the classes. Maintaining fewer queues and eliminating additional processing steps required to route requests based on combinations of classes further simplifies the hybrid model 230 framework to reduce operating and hosting costs for the hybrid model relative to ensemble model implementations.

The contact type predictions 250 generated by the hybrid model 230 are detailed routing decisions based on multiple routing predictions. The multi-channel output of the deep learning component allows the hybrid model to consider more aspects of the context of the customer service request relative to other routing systems. The additional context information enables the support routing system 206 to route user requests that include difficult questions that previously required manual review for routing. The additional context information also enables the support routing system 206 to more accurately and more precisely determine the complexity of the user requests. The ability of the support routing system 206 to distinguish simple questions from complex questions reduces the operating costs of the support platform by shifting a greater number of the simple questions to cheaper associates and reducing the use of more expensive credentialed experts.

The routing predictions 240 generated by the deep learning component 232 and the business rules 244 of the business logic component 242 allow the hybrid model 230 to make routing decisions based on characteristics of particular support groups, the complexity of user requests, the intent of user inputs, and the effectiveness of particular contact channels and support groups. For example, the support group predictions 342 and queue predictions 344 are based on the performance (e.g., handling time) and proficiency of particular agents and groups of agents while handling user requests of a particular intent and complexity. The intent predictions 340 inform the hybrid model 230 about the type of information requested by the user and the complexity of the user request based on the text input by the user. The contact channel predictions 346 are based on the preferences of users and the performance and proficiency of particular agents and support groups when handling requests of a particular intent and complexity over different contact channels (e.g., phone call, text message, video chat, and the like). The business rules 244 enable the hybrid model 230 to modify contact types and other routing decisions based on real time conditions of the platform (e.g., amount of traffic on the platform, the wait time for particular agents, the amount of agents staffed in a particular support group, and the like). Ensemble model implementations of the prior art include a different model for each prediction type. Therefore, developing an ensemble model that generates routing requests based on all of the features considered by the hybrid model 230 would require training and maintaining a separate model for each unique set of features. Additional steps required to normalize the features output by each of the models would also increase the development time, operating costs, and complexity of ensemble model implementations relative to the hybrid model 230.

The business rules 244 also enable the hybrid model 230 to rapidly adapt to products changes, modifications to tax laws and or account rules, and other new events. For example, the business rules 244 enable the hybrid model to route requests related to recent changes in the tax law or other information that is important to users and or respond to current events and recent developments. The business rules 244 can also route requests for information that have not been previously submitted by other users. Ensemble model implementations are unable to adapt quickly to changes and other new events because it takes time to collect data after changes occur and re-train the model on the data generated after the change. Therefore, routing decisions for unique requests and requests related to recent changes made by ensemble models are less accurate relative to routing decisions for similar requests made using the hybrid model 230.

The improved routing accuracy provided by the support routing system 206 reduces the average handling time for user requests. The support routing system 206 consistently routes requests to the correct support group (e.g., the support group optimized to handle the intent and complexity of the request) to reduce the number of times a request has to be re-routed manually and resolve each request in less time. The faster handling time results in an improved user experience and increases the confidence users have in the information service. While FIGS. 2-3 show a configuration of components, other configurations may be used without departing from the scope of the disclosed principles. For example, various components may be combined to create a single component. As another example, the functionality performed by a single component may be performed by two or more components.

Figure 4:
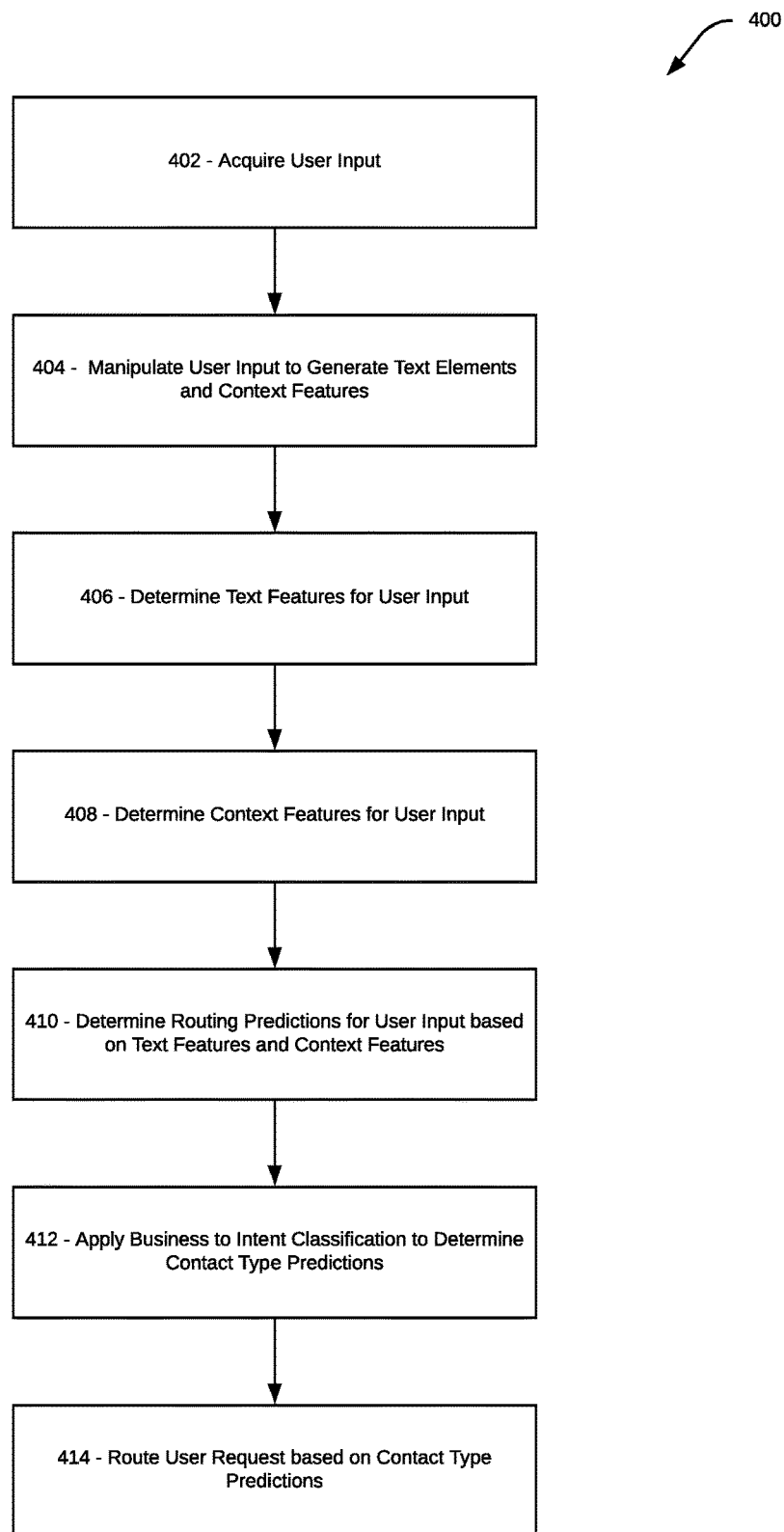
FIG. 4 is a flow diagram illustrating an exemplary method for generating routing predictions according to an embodiment of the present disclosure.

FIG. 4 is a flowchart illustrating an exemplary process 400 for generating and using contact type predictions according to the disclosed principles. The process 400 may be implemented using the computer system 200 shown in FIGS. 2-3. At step 402, user input is acquired from a user device. User input may include a text component (e.g., a question, search query, or other input text submitted by a user), session data, temporal data, and other data related to the user submitting the user input. Session data may include one or more context elements that describe the user interface screen, product, language, geography, platform type and other elements describing the product the user is working in and activities within the product that resulted in the user submitting a question, problem, search query or other request in the user input. Temporal data may include timing data that identifies the date and time the user submitted the user input to the information service and or support platform. At step 404, the user input is received by the data preprocessing package. The data preprocessing package manipulates the user input to extract words, numerical values, symbols, and other text elements from one or more text strings included in the user input. The data preprocessing package also extracts context features from the session data, temporal data, and other data associated with the user. The data preprocessing package may then clean, standardize, and or modify the extracted text elements and or context data to generate text elements and context features that may be received by the machine learning system as input data.

At step 406, text elements from the input data are fed into the feature extraction layers of the deep learning component to determine text features. The text features can include world features and or sentence features. The word features include, for example, word embeddings, vectors, or other numerical representations of text data. The sentence features may include sentence level representations of the text data. The sentence features may be generated by aggregating word features for each word included in a sentence in the user input. The sentence features may also be generated by determining one or more statistical measurements for the word features and or using one or more neural network layers or other unsupervised learning approaches to extract meaningful data about the content, meaning, context, arrangement, or properties of words included in each sentence of the user input.

At step 408, the temporal data and user context data are fed into the feature extraction layers of the deep learning component to determine the context features. The context features can include user context features and temporal context features. The user context features can include UI screen id, product SKU, product language, geography, tax context features and other domain specific context features generated from data collected by the information service, device interaction features, and other features derived from the user context data. Temporal context features can include the day of the week the user accessed the information service and the time of day the user accessed the information service, and other timing data that may be used to determine the availability, wait times, and other real time conditions of the support platform and or information service.

At step 410, the deep learning component determines one or more routing predictions based on the text features and the context features. To determine the routing predictions, the text features and context features are input into one or more dense layers. The dense layers can include one or more fully connected layers or other NN layers that interpret the text features and or context features using a set of learned weights. The dense layers generate a model output that is fed into one or more classification layers. The classification layers classify the user input into one or more classes that describe the routing parameters used to route the user request included in the user input to a support group included in a support platform. The routing predictions generated by the deep learning component may include an intent prediction that corresponds to the type of information the user is seeking to elicit by submitting the user input and or the type of information required to resolve a request included in user input. For example, user inputs including questions about accounting products of the information service may be given an accounting product intent. In another example, user inputs including tax advice questions may be given a tax advice intent. The support group predictions include a support group that handles request having the same intent as the user input. The queue predictions assign the user input to a queue based on the complexity of the request included in the user input. The contact type predictions specify a contact type that an agent can use to connect with a user.

At step 412, one or more business rules are applied to the routing predictions generated by the deep learning component to determine a contact type prediction for each user input. The business rules may modify the contact type predicted by the routing predictions based on, for example, the inclusion of one or more keywords in the user input and or a confidence score or other criteria for one or more of the routing predictions. The business rules may be dynamically applied to rapidly address new situations and user intents that may arise due to, for example, specific changes in the products included in the information service and or new and or updated tax rules or other rules that impact the products or services offered in the information service. The business rules may also be used to adjust the contact type predictions to rapidly adapt to changes in a particular geography, industry, customer base, business environment, and or economic conditions (e.g., pandemics, economic recessions, changes in tax law, disruptive technologies and or business models, and the like).

At step 414, the contact type predictions may be integrated into a support platform of the information service. For example, the contact type predictions are used to route questions and other user requests to handling agents and or call queues to connect users with subject matter experts that can resolve each user's request faster and more efficiently. The contact type predictions may also define the contact channel (e.g., phone call, text message, video chat, and the like) that the handling agents and or subject matter experts use to contact the users.

Figure 5:
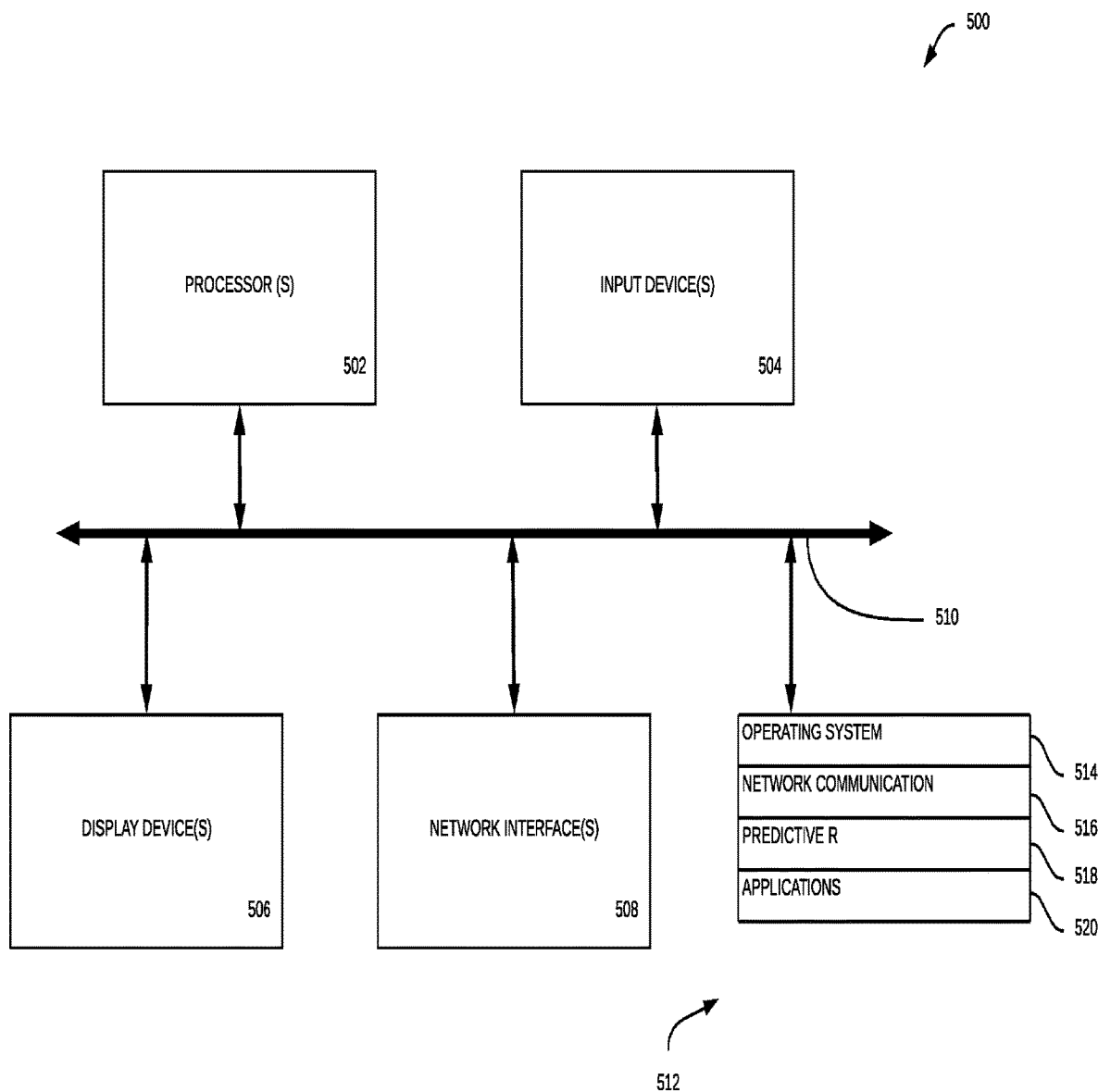
FIG. 5 is a block diagram illustrating a computing device according to an embodiment of the present disclosure.

FIG. 5 is a block diagram of an exemplary computing device 500 that may implement various features and processes as described herein. For example, computing device 500 may function as first server 120, second server 130, computer system 200, or a portion or combination thereof in some embodiments. The computing device 500 may be implemented on any electronic device that runs software applications derived from compiled instructions, including without limitation personal computers, servers, smart phones, media players, electronic tablets, game consoles, email devices, etc. In some implementations, the computing device 500 may include one or more processors 502, one or more input devices 504, one or more display devices 506, one or more network interfaces 508, and one or more computer-readable media 512. Each of these components may be coupled by a bus 510.

Display device 506 may be any known display technology, including but not limited to display devices using Liquid Crystal Display (LCD) or Light Emitting Diode (LED) technology. Processor(s) 502 may use any known processor technology, including but not limited to graphics processors and multi-core processors. Input device 504 may be any known input device technology, including but not limited to a keyboard (including a virtual keyboard), mouse, track ball, and touch-sensitive pad or display. Bus 510 may be any known internal or external bus technology, including but not limited to ISA, EISA, PCI, PCI Express, USB, Serial ATA or FireWire. Computer-readable medium 512 may be any non-transitory computer readable medium that participates in providing instructions to processor(s) 502 for execution, including without limitation, non-volatile storage media (e.g., optical disks, magnetic disks, flash drives, etc.), or volatile media (e.g., SDRAM, ROM, etc.).

Computer-readable medium 512 may include various instructions 514 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 504; sending output to display device 506; keeping track of files and directories on computer-readable medium 512; controlling peripheral devices (e.g., disk drives, printers, etc.) which can be controlled directly or through an I/O controller; and managing traffic on bus 510. Network communications instructions 516 may establish and maintain network connections (e.g., software for implementing communication protocols, such as TCP/IP, HTTP, Ethernet, telephony, etc.).

Predictive routing instructions 518 include instructions that implement the disclosed process for generating routing predictions to route customer service requests to support queues as described herein.

Application(s) 520 may be an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the principles disclosed herein can acquire and manipulate text data and session data having any format. The machine learning based approaches to generating intent predictions described herein are also more flexible and efficient than rules based techniques. The machine learning models may be scaled to classify user inputs collected from a wide variety of products and services without requiring document specific rules. The machine learning models therefore require fewer storage resources to maintain and less processing load to execute relative to product specific rules based approaches. Accordingly, the machine learning approaches described herein can generate intent predictions for a wide variety of user inputs more accurately with fewer computational resources relative to rules based prediction methods.

Another benefit of the disclosed principles is that they generate labeled training data that may be used to improve the accuracy of the machine learning models used to generate the intent predictions. These are major improvements in the technological art as they improve the functioning of the computer and are an improvement to the technology and technical fields of text data processing, natural language processing, feature engineering, information transfer, information routing, information generation, customer experience, and customer service.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method, comprising:
   determining text features of a user input based on providing a string of text data in the user input to one or more text embedding layers included in a machine learning model;
   determining context features of the user input based on providing a context data in the user input to one or more featurization layers included in the machine learning model;
   determining a multi-channel output based on providing the text features and the context features to one or more layers included in the machine learning model; and
   routing a user request, associated with the user input, based on the multi-channel output.

2. The computer implemented method of claim 1, further comprising:
   modifying the multi-channel output based on one or more business rules related to a characteristic of the user input; and
   routing the user request based on the modified multi-channel output.

3. The computer implemented method of claim 1, further comprising:
   training the one or more embedding layers using a large corpus of documents; and
   tuning the one or more embedding layers using a specialized corpus of documents related to a particular subject matter, wherein the specialized corpus of documents is smaller than the large corpus of documents and the specialized corpus of documents has a greater number of documents related to the particular subject matter relative to the large corpus of documents.

4. The computer implemented method of claim 1, wherein the text features include word features and sentence features and each of the word features includes a learned representation of text that reflects a meaning of a particular word as the particular word is used within the user input.

5. The computer implemented method of claim 1, wherein the context features include temporal context features and user context features generated from session data and data associated with the user request.

6. The computer implemented method of claim 1, wherein the multi-channel output includes an intent prediction that classifies the user input into a class selected from a plurality of classes, wherein each class corresponds to a particular type of information required to resolve the user request expressed in the user input.

7. The computer implemented method of claim 1, wherein the multi-channel output includes a support group prediction that classifies the user input into a class selected from a plurality of classes, wherein each class corresponds to a particular support group handing customer service requests having an intent of the user input.

8. The computer implemented method of claim 1, wherein the multi-channel output includes a queue prediction that classifies the user input into a class selected from a plurality of classes, wherein each class corresponds to a particular queue handled by a group of agents handing customer service requests having an intent and a complexity of the user input.

9. The computer implemented method of claim 1, wherein the multi-channel output includes a contact channel prediction that classifies the user input into a class selected from a plurality of classes, wherein each class corresponds to a particular contact channel used to communication with a user submitting the user input.

10. The computer implemented method of claim 1, wherein providing the string of text data to the one or more text embedding layers comprises:
   manipulating, by a preprocessing package, the string of text data to generate a plurality of text elements; and
   providing the plurality of text elements to the one or more text embedding layers.

11. A system comprising:
   a memory including executable instructions; and
   a processor configured to execute the executable instructions and cause the system to:
      determine text features of a user input based on providing a string of text data in the user input to one or more of text embedding layers included in a machine learning model;
      determine context features of the user input based on providing a context data in the user input to one or more featurization layers included in the machine learning model;
      determine a multi-channel output based on providing the text features and the context features to one or more layers included in the machine learning model; and
      route a user request, associated with the user input, based on the multi-channel output.

12. The system of claim 11, wherein the processor is further configured to:
   modify the multi-channel output based on one or more business rules related to a characteristic of the user input; and
   route the user request based on the modified multi-channel output.

13. The system of claim 11, wherein the processor is further configured to:
   train the one or more text embedding layers using a large corpus of documents; and
   tune the one or more text embedding layers using a specialized corpus of documents related to a particular subject matter, wherein the specialized corpus of documents is smaller than the large corpus of documents and the specialized corpus of documents has a greater number of documents related to the particular subject matter relative to the large corpus of documents.

14. The system of claim 11, wherein the text features include word features and sentence features and each of the word features includes a learned representation of text that reflects a meaning of a particular word as the particular word is used within the user input.

15. The system of claim 11, wherein the context features include temporal context features and user context features generated from session data and data associated with the user request.

16. The system of claim 11, wherein the multi-channel output includes an intent prediction that classifies the user input into a class selected from a plurality of classes, wherein each class corresponds to a particular type of information required to resolve the user request expressed in the user input.

17. The system of claim 11, wherein the multi-channel output includes a support group prediction that classifies the user input into a class selected from a plurality of classes, wherein each class corresponds to a particular support group handing customer service requests having an intent of the user input.

18. The system of claim 11, wherein the multi-channel output includes a queue prediction that classifies the user input into a class selected from a plurality of classes, wherein each class corresponds to a particular queue handled by a group of agents handing customer service requests having an intent and a complexity of the user input.

19. The system of claim 11, wherein the multi-channel output includes a contact channel prediction that classifiers the user input into a class selected from a plurality of classes, wherein each class corresponds to a particular contact channel used to communication with a user submitting the user input.

20. The system of claim 11, wherein providing the string of text data to one or more text embedding layers comprises:
   manipulating, by a preprocessing package executed by the processor, the string of text data to generate a plurality of text elements; and
   providing the plurality of text elements to the one or more text embedding layers.

* * * * *